(12) United States Patent
Egger et al.

(10) Patent No.: US 11,285,407 B2
(45) Date of Patent: Mar. 29, 2022

(54) LIQUID CLEANING ELEMENT, LIQUID CLEANING SYSTEM, AND METHOD FOR PRODUCING A LIQUID CLEANING ELEMENT

(71) Applicant: MANN+HUMMEL GmbH, Ludwigsburg (DE)

(72) Inventors: Pascal Egger, Rudersberg (DE); Heiko Wyhler, Stuttgart (DE); Alois Maier, Unterdietfurt (DE); Norbert Strassenberger, Adlkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 311 days.

(21) Appl. No.: 16/391,619

(22) Filed: Apr. 23, 2019

(65) Prior Publication Data
US 2019/0247771 A1   Aug. 15, 2019

Related U.S. Application Data

(63) Continuation of application No. PCT/EP2017/077051, filed on Oct. 24, 2017.

(30) Foreign Application Priority Data

Oct. 27, 2016   (DE) .......................... 102016012936.0

(51) Int. Cl.
*B01D 29/01*      (2006.01)
*B01D 29/05*      (2006.01)
(Continued)

(52) U.S. Cl.
CPC ......... *B01D 29/014* (2013.01); *B01D 29/012* (2013.01); *B01D 29/05* (2013.01);
(Continued)

(58) Field of Classification Search
CPC .......................... B01D 29/014; B01D 35/0273; B01D 29/071; B01D 29/012; B01D 29/05;
(Continued)

(56) References Cited

U.S. PATENT DOCUMENTS 5,316,670 A * 5/1994 Yao ...................... A01K 63/045
                                                                 119/259
5,891,207 A    4/1999 Katta
6,395,167 B1   5/2002 Mattson, Jr. et al.

FOREIGN PATENT DOCUMENTS

DE        2323513 A1    11/1973
DE        2936373 A1     3/1980
(Continued)

*Primary Examiner* — Madeline Gonzalez

(57) ABSTRACT

A liquid cleaning element has a cleaning medium and a carrier medium connected to each other. The carrier medium is provided with a liquid connector to connect to a line for liquid to be cleaned or cleaned liquid. The liquid cleaning element has a bend in a section provided with the cleaning medium and the carrier medium. The carrier medium, prior to connection to the cleaning medium, is pre-manufactured in a final shape of the liquid cleaning element. The liquid connector has a cylindrical suction socket and is arranged at or integrated in the carrier medium. A liquid cleaning system is provided with the liquid cleaning element and a holder holding the liquid cleaning element. In a method for producing the liquid cleaning element, the carrier medium is pre-manufactured in a final shape of the liquid cleaning element and the cleaning medium is connected to the pre-manufactured carrier medium.

8 Claims, 3 Drawing Sheets

(51) Int. Cl.
*B01D 35/027* (2006.01)
*B01D 29/07* (2006.01)

(52) U.S. Cl.
CPC ....... *B01D 29/071* (2013.01); *B01D 35/0273* (2013.01); *B01D 2201/0415* (2013.01); *B01D 2201/31* (2013.01); *B01D 2201/40* (2013.01)

(58) Field of Classification Search
CPC ............ B01D 2201/40; B01D 2201/31; B01D 2201/0415; B01D 35/30; B01D 2201/30; B01D 2201/29; B01D 35/027; B01D 29/13; B01D 35/306; B01D 29/0009; B01D 29/035; E04H 4/12; E04H 4/16; A01K 63/04
USPC ..... 210/167.12, 167.21, 435, 439, 441, 444, 210/445, 446, 497.01, 471, 494.2, 495
See application file for complete search history.

(56) References Cited

FOREIGN PATENT DOCUMENTS

| | | |
|---|---|---|
| DE | 19856723 A1 | 6/2000 |
| DE | 102006034544 A1 | 2/2007 |
| DE | 102014103715 A1 | 9/2015 |
| DE | 102015006475 A1 | 11/2015 |
| EP | 1495789 B1 | 1/2005 |
| EP | 2556225 B1 | 2/2013 |
| JP | H1182210 A | 3/1999 |
| JP | 2001020821 A | 1/2001 |
| WO | 2016140036 A1 | 9/2016 |

\* cited by examiner

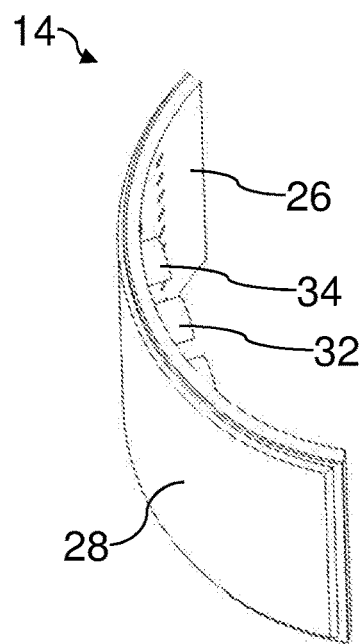
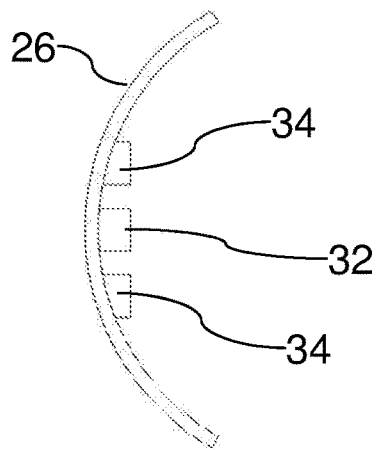
Fig. 3 Fig. 4
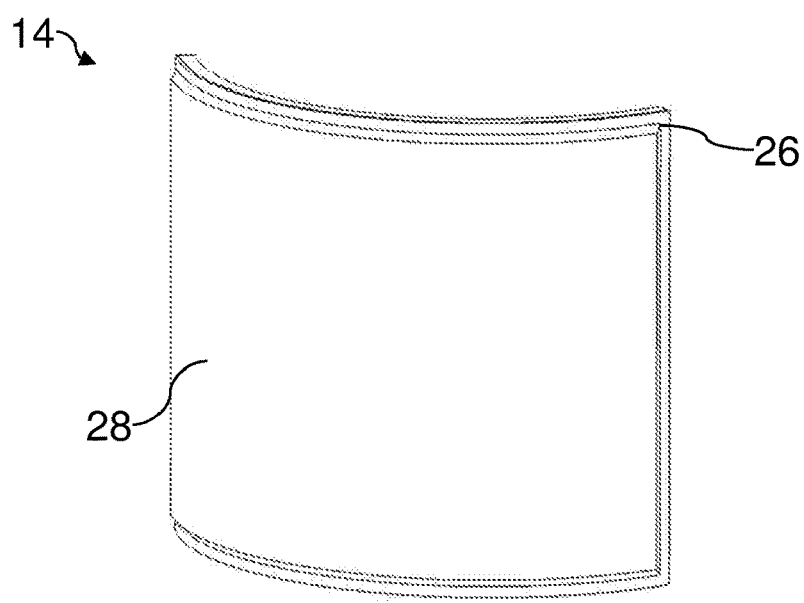
Fig. 5

LIQUID CLEANING ELEMENT, LIQUID CLEANING SYSTEM, AND METHOD FOR PRODUCING A LIQUID CLEANING ELEMENT

CROSS-REFERENCE TO RELATED APPLICATIONS

This application is a continuation application of international application No. PCT/EP2017/077051 having an international filing date of 24 Oct. 2017 and designating the United States, the international application claiming a priority date of 27 Oct. 2016 based on prior filed German patent application No. 10 2016 012 936.0, the entire contents of the aforesaid international application and the aforesaid German patent application being incorporated herein by reference.

BACKGROUND OF THE INVENTION

The invention concerns a liquid cleaning element of or for a liquid cleaning system, with at least one cleaning medium and at least one carrier medium, wherein the at least one carrier medium comprises at least one liquid connector for at least one line for liquid to be cleaned or cleaned liquid, the at least one cleaning medium and the at least one carrier medium are connected to each other, and the liquid cleaning element comprises at least one bend in at least one section with the at least one cleaning medium and the at least one carrier medium.

Moreover, the invention concerns a liquid cleaning system with at least one liquid cleaning element and at least one holder for the at least one liquid cleaning element, wherein the at least one liquid cleaning element comprises at least one cleaning medium and at least one carrier medium, wherein the at least one carrier medium comprises at least one liquid connector for at least one line for liquid to be cleaned or cleaned liquid, the at least one cleaning medium and the at least one carrier medium are connected to each other, and the liquid cleaning element comprises at least one bend in at least one section with the at least one cleaning medium and the at least one carrier medium.

Moreover, the invention concerns a method for producing a liquid cleaning element with at least one carrier medium, at least one cleaning medium, and at least one bend in at least one section with the at least one carrier medium and the at least one cleaning medium, wherein in the method the at least one carrier medium and the at least one cleaning medium are connected to each other.

DE 10 2014 103 715 A1 discloses a multi-layer liquid cleaning element with a liquid-permeable cover layer and a liquid-tight base layer. The base layer comprises a suction connector for sucking in liquid through the liquid cleaning element. At least the cover layer and the base layer are connected to each other by a connection. The base layer comprises a structured surface that is at least partially oriented toward the cover layer. The liquid cleaning element is arranged in a receptacle at a device and adapted to an outer surface of a housing. In addition, a cover element can be present which fixes the liquid cleaning element permanently at the housing or the outer surface of the housing.

SUMMARY OF THE INVENTION

The invention has the object to design a liquid cleaning element, a liquid cleaning system, and a method of the aforementioned kind in which a mechanical stability of the liquid cleaning element is improved.

This object is solved according to the invention in that the at least one carrier medium, prior to connection with the at least one cleaning medium, is pre-manufactured in the final shape of the liquid cleaning element.

According to the invention, the at least one carrier medium is pre-manufactured in its final geometric shape. The pre-manufactured at least one carrier medium is only thereafter connected to the at least one cleaning medium. In this context, the at least one cleaning medium can be adapted mechanically stress-free to the shape of the at least one carrier medium. In this way, the at least one carrier medium can be connected and remain connected without mechanical stress to the at least one cleaning medium. In contrast to the base layer of the liquid cleaning element known from the prior art, the material of the at least one carrier medium according to the invention does not have the tendency to relax into its original flat state. As a whole, loads on the material of the at least one carrier medium and/or on the material of the at least one cleaning medium can be reduced. In particular, deformations, cracks, and/or stresses in the components can be avoided. In contrast to the liquid cleaning elements that are shaped, in particular bent, after the at least one cleaning medium and the at least one carrier medium have been connected, it can be avoided with the invention that the at least one cleaning medium can slide on the at least one carrier medium during or after the deformation, in particular in order to relax into its initial position. As a whole, a mechanical stability of the liquid cleaning element is improved with the invention.

The at least one carrier medium can advantageously serve as a rear wall for the at least one cleaning medium. The at least one carrier medium can thus predefine the shape and the mechanical stability of the liquid cleaning element.

By shaping the at least one carrier medium prior to connection to the at least one cleaning medium, a higher shape tolerance can be obtained. The liquid cleaning element remains in its final geometry and does not attempt to relax into a flat position, as may be the case in subsequently deformed liquid cleaning elements.

The at least one carrier medium comprises at least one liquid connector for liquid to be cleaned or cleaned liquid. A corresponding liquid supply line or liquid discharge line can be connected in a simple way to the at least one liquid connector. The at least one cleaning medium can be applied with minimal expenditure to the at least one carrier medium with the already existing at least one liquid connector.

Advantageously, at least one liquid connector can comprise or form at least one outlet, in particular a suction connector for sucking in liquid, or at least one inlet for liquid. By means of the at least one liquid connector, the liquid can be sucked in or pumped through the liquid cleaning element.

At least one line which can be connected to the at least one liquid connector can be connected to a pump or the like or can be part thereof. The at least one line can be an inlet or an outlet of a pump or can be connected to the inlet or the outlet. The pump can thus be connected or is connectable directly to the at least one liquid connector.

Advantageously, the at least one liquid connector can be a socket, i.e., a suction socket, in particular in the form of a pipe socket. The suction socket can be in particular cylindrical. The suction socket can also be in particular integrated into the liquid connector. A suction socket can also serve as a mechanical connector for corresponding lines. Moreover, a socket itself can serve as a line part. These embodiments are particularly advantageous in suction filters in tank systems which even with partial filling with liquid below the suction socket can be used in complex installation space situations. Also, these embodiments enable an advantageous one-piece configuration of carrier medium and suction socket whereby costs are reduced. Moreover, the increased shape stability with simultaneous installation space flexibility is particularly advantageous in these embodiments.

The at least one liquid connector can advantageously be integrated into the at least one carrier medium. In this way, the at least one liquid connector can be pre-manufactured together with the at least one carrier medium and/or connected to the at least one cleaning medium. As a whole, a manufacturing, component and/or mounting expenditure can thus be reduced.

Advantageously, the at least one liquid connector can be connected to an intermediate space between the at least one carrier medium and the at least one cleaning medium. In this way, liquid from the intermediate space can be removed through the at least one liquid connector. In reverse flow direction of the liquid through the liquid cleaning element, liquid can be alternatively introduced through the at least one liquid connector into the intermediate space.

Advantageously, the at least one intermediate space can be loaded by means of the at least one liquid connector with a pressure, in particular a vacuum or an excess pressure. In this way, liquid to be cleaned or cleaned liquid can be sucked through the at least one cleaning medium into the intermediate space or correspondingly pressed out of it.

Advantageously, the at least one carrier medium, in particular the material of the at least one carrier medium, can be impermeable for liquid. In this way, as needed, the intermediate space between the at least one carrier medium and the at least one cleaning medium can be sealed at the side of the at least one carrier medium. Upon loading the intermediate space with a pressure, in particular a vacuum or excess pressure, the liquid must flow through the at least one cleaning medium and cannot escape through the at least one carrier medium.

Advantageously, the at least one cleaning medium can be liquid-permeable. In this way, the liquid can flow through the at least one cleaning medium and can be cleaned thereby.

Advantageously, at least one cleaning medium can be embodied as a filter medium. In particular particles can be filtered out of the liquid with a filter medium. Correspondingly, the liquid cleaning system can be a liquid filter.

Alternatively or additionally, at least one cleaning medium can have a cleaning action different from pure filtration.

The liquid cleaning system, in particular the liquid cleaning element, can advantageously be arranged in a line system and/or a tank for liquid. In this way, the liquid can directly flow into and/or through it and thereby be cleaned.

Advantageously, the liquid cleaning system, in particular the liquid cleaning element, can be used in connection with an internal combustion engine and/or a motor vehicle.

The liquid cleaning system, in particular the liquid cleaning element, can be used in connection with an exhaust gas cleaning system.

Advantageously, the liquid cleaning element can be part of a filter for urea solution, in particular aqueous urea solution or urea water solution.

The filter can advantageously be employed in connection with a so-called SCR catalyst for selective catalytic reduction of nitrogen oxides in exhaust gases. The SCR catalyst can be part of an exhaust gas manifold of an internal combustion engine in particular of a motor vehicle.

The invention is however not limited to a filter for urea (water) solution of an internal combustion engine of a motor vehicle. Rather, it can also be used for different liquid systems, in particular fuel systems, motor oil systems, hydraulic systems, cooling agent systems or the like, of motor vehicles or other machines, in particular agricultural machines or construction machinery. The liquid cleaning system, in particular the liquid cleaning element, can also be employed outside of the automotive technology, in particular in industrial motors.

The invention can be used in motor vehicles, in particular passenger cars, trucks, buses, agricultural and/or construction vehicles, construction/agricultural machines, compressors, industrial motors, or other devices, in particular with internal combustion engines.

In an advantageous embodiment, the at least one carrier medium can be at the most elastically deformable. In this way, with the at least one carrier medium the shape of the filter element can be predetermined and maintained. ʌAt the most elastically deformable@ in the meaning of the invention means that the at least one carrier medium can be elastically deformable or cannot be deformed, at least not without causing destruction.

Advantageously, the at least one carrier medium can be elastically deformable. In this case, it can assume its original state again once a deforming force is canceled. Moreover, manufacturing, component, and/or operating-caused tolerances can be better compensated in this way.

Advantageously, the at least one carrier medium cannot be deformed, in particular cannot be deformed without causing destruction. In this case, it can exhibit an increased stability. In this way, it can also be avoided that possible, particularly elastic, deformations can lead to an impairment, in particular destruction, of the at least one cleaning medium and/or of the connection of the at least one cleaning medium with the at least one carrier medium.

In a further advantageous embodiment, the at least one carrier medium can be realized as an injection-molded and/or cast part or bent part, stamped part, or pressed part. In this way, the at least one carrier medium can also be furnished with complex shapes. In this way, in particular at least one liquid connector and/or optionally at least one drainage structure can be integrated into the at least one carrier medium during the same manufacturing process.

In a further advantageous embodiment, at least one carrier medium can comprise plastic material and/or metal or can be comprised thereof. Plastic material can be processed and shaped easily in particular by an injection molding and/or casting method. Moreover, a liquid-tight carrier medium can be realized from plastic material. Metal can be bent, stamped or pressed in a simple way.

At least one carrier medium can be comprised exclusively of plastic material. Alternatively or additionally, at least one carrier medium can be comprised of a material mixture, in particular a composite material.

Alternatively or additionally, at least one carrier medium can be advantageously comprised of a different material or a material mixture, in particular metal, carbon fiber material or the like or at least comprise such materials or material mixtures.

In a further advantageous embodiment, the at least one carrier medium can extend at least partially circumferentially in regard to the circumference relative to an imaginary axis. In this way, the liquid cleaning element can be realized in a space-saving way with a correspondingly large surface for the liquid to flow in and/or flow though.

Advantageously, the at least one carrier medium can be adapted, at least in sections, to an imaginary almost hollowcylindrical shape. In this way, a beneficial ratio between space requirement and surface can be realized.

Advantageously, the at least one carrier medium can be open at a side which is circumferential relative to the imaginary axis. In this way, a space which is surrounded by the at least one carrier medium, in particular the liquid cleaning element, can be accessible from the exterior.

In a further advantageous embodiment, the at least one cleaning medium and the at least one carrier medium can be connected to each other at least by a material-fused connection. Material-fused connections have the advantage that they are additionally liquid-tightly realizable.

Advantageously, the at least one cleaning medium and the at least one carrier medium can be connected to each other by means of a fused connection, an adhesive connection, a soldered connection or the like, or a combination of different connections. Alternatively or additionally, at least one form-fit and/or friction-fit connection can be provided also.

Advantageously, the at least one cleaning medium can be connected at least along its rims fluid-tightly with the at least one carrier medium. In this way, at least one intermediate space which is closed relative to the environment of the liquid cleaning element can be realized between the at least one cleaning medium and the at least one carrier medium. The cleaned liquid can reach the at least one intermediate space after passing through the at least one cleaning medium. Alternatively, with corresponding reverse flow direction, fluid to be cleaned can flow from the intermediate space through the at least one cleaning medium into the environment of the liquid cleaning element. In case the liquid cleaning element, in particular the liquid cleaning system, is arranged in a liquid tank, the Aenvironment of the liquid cleaning element@ means the interior of the liquid tank.

In a further advantageous embodiment, the at least one carrier medium can comprise a structured surface which is at least partially facing the at least one cleaning medium. In this way, corresponding spacers for spacing the at least one cleaning medium from the corresponding surface of the at least one carrier medium can be realized by means of the structure. Accordingly, at least one intermediate space between the at least one carrier medium and the at least one cleaning medium can be realized. With corresponding structures at the surface of the at least one carrier medium, liquid-conducting regions can be delimited at least partially. It is thus possible to dispense with separate media layers between the at least one carrier medium and the at least one cleaning medium for realizing fluid-conducting regions. Also, a mounting expenditure can be reduced in that the at least one cleaning medium is applied directly onto the at least one carrier medium with the already existing structured surface.

Advantageously, with the structured surface of the at least one carrier medium at least one drainage, in particular a drainage structure, can be formed. Liquid can be guided by the drainage. As a whole, a separate manufacture and assembly of a separate drainage layer can be dispensed with due to the invention.

Advantageously, the at least one drainage can be realized on the surface which is facing the at least one cleaning medium. In this way, the liquid can be guided between the at least one carrier medium and the at least one cleaning medium.

Advantageously, the at least one drainage can be realized by means of cylindrical projections, ribs or a rib structure. By means of ribs, corresponding elongate regions for guiding the liquid can be delimited.

Moreover, the technical object is solved according to the invention for the liquid cleaning system in that the at least one carrier medium, prior to connection with the at least one cleaning medium, is pre-manufactured in the final shape of the liquid cleaning element. In this way, the liquid cleaning element can be realized mechanically stable and robust.

Advantageously, the at least one holder can comprise at least one cover part.

Advantageously, the at least one holder can comprise at least one pump or can be connected thereto. With the at least one pump, the liquid can be pumped, in particular sucked or pushed, through the liquid cleaning system, in particular the at least one cleaning element.

Advantageously, the at least one holder can comprise at least one holder part with at least one pump, in particular the pump holder part. In this way, the at least one pump can be integrated into the at least one holder, in particular the holder part. The at least one pump can thus be pre-manufactured and/or mounted together with the at least one holder, in particular the at least one holder part.

Advantageously, the at least one liquid cleaning element can be detachably connected to the at least one holder. In this way, the at least one liquid cleaning element can be removed, in particular exchanged, for maintenance purposes.

Advantageously, the at least one holder can comprise several holder parts, in particular a cover part and/or a pump holder part which are connected to each other so as to be separable. In this way, the holder parts for maintenance purposes, in particular for removal or for exchange of the at least one liquid cleaning element, can be separated from each other.

Moreover, the technical object is solved according to the invention for the method in that the at least one carrier medium is pre-manufactured in the final shape of the liquid cleaning element and the at least one cleaning medium is subsequently connected to the at least one carrier medium. According to the invention, shaping of the liquid cleaning element is realized by the pre-manufactured at least one carrier medium. The at least one cleaning medium can thus be connected mechanically free of stress with the pre-shaped at least one carrier medium.

In other respects, the features and advantages which have been explained in connection with the liquid cleaning element according to the invention, the liquid cleaning system according to the invention, and the method according to the invention and their respective advantageous embodiments apply correspondingly among each other and reciprocatingly. Of course, the individual features and advantages can be combined with each other wherein further advantageous effects may result which surpass the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will expediently consider the features disclosed in combination in the drawing, the description, and the claims also individually and combine them to meaningful further combinations.

FIG. 3 shows the filter element of FIGS. 1 and 2 in isometric illustration.

FIG. 4 shows the filter element of FIGS. 1 to 3 in plan view.

FIG. 5 shows the filter element of FIGS. 1 to 4 in isometric illustration with a view of the inflow side.

Same components are provided with same reference characters in the Figures.

DESCRIPTION OF PREFERRED EMBODIMENTS

Figure 1:
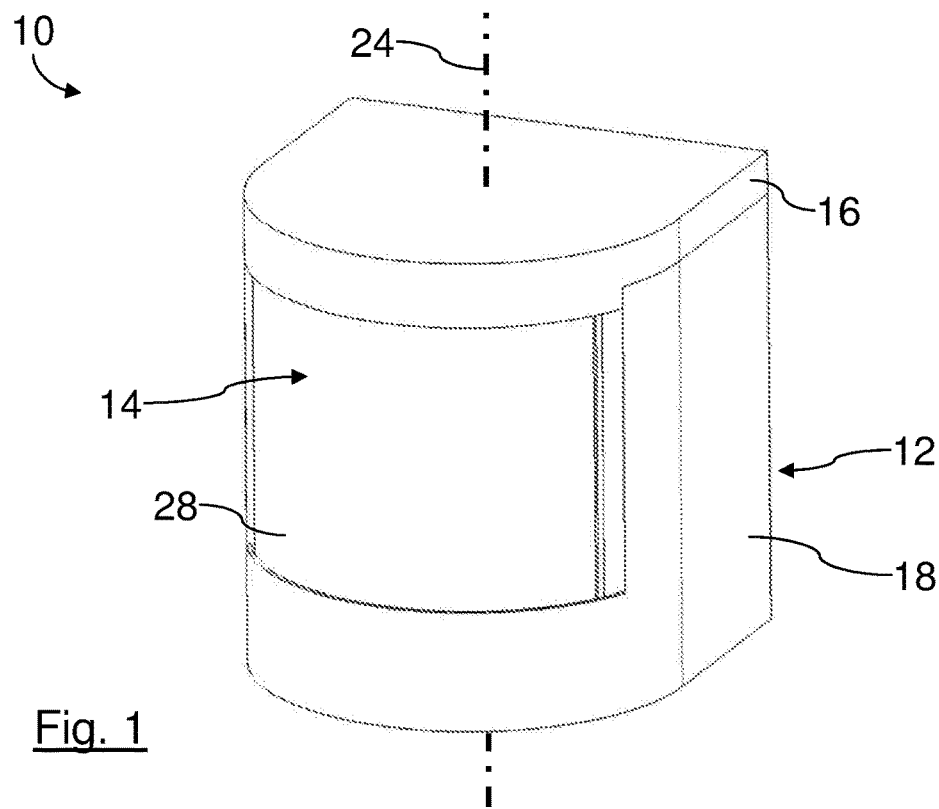
FIG. 1 shows a filter with a filter element for urea water solution.
Figure 2:
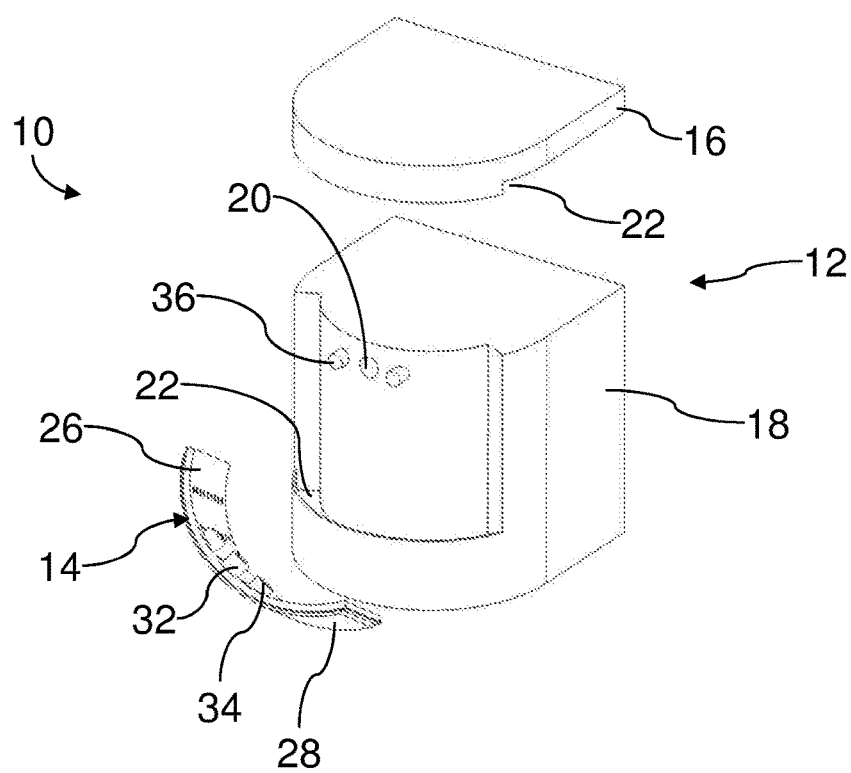
FIG. 2 shows the filter of FIG. 1 in an exploded illustration.
Figure 6:
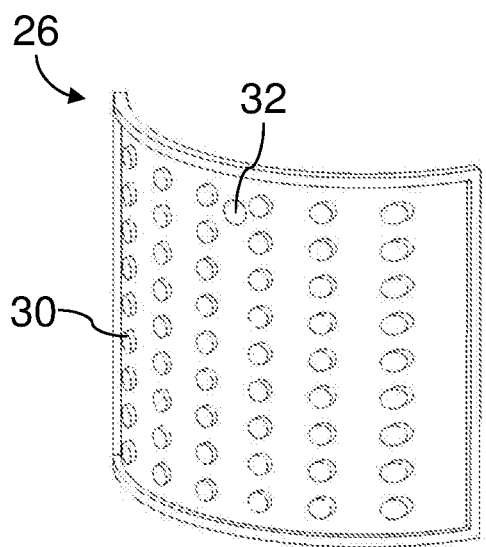
FIG. 6 shows a carrier part of the filter element of FIGS. 1 to 5 in isometric illustration with a view of the inflow side.
Figure 7:
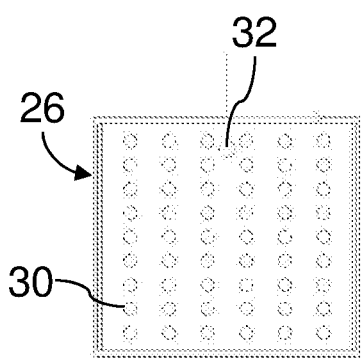
FIG. 7 shows the carrier part of FIG. 6 in front view.
Figure 8:
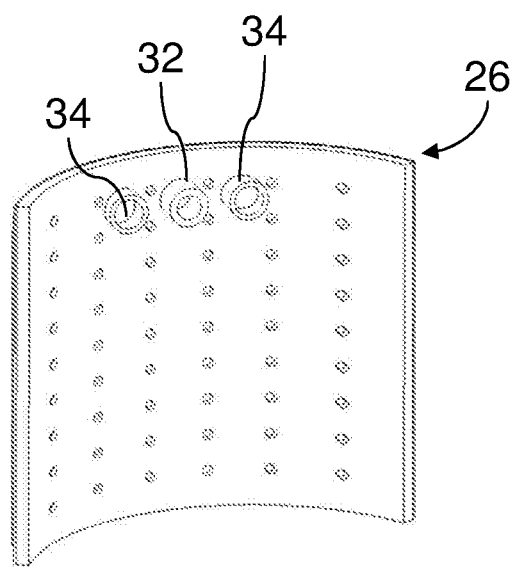
FIG. 8 shows the carrier part of FIGS. 6 and 7 in isometric illustration with a view of the outflow side.

In FIGS. 1 and 2, a filter 10 for urea water solution is shown in different illustrations. The filter 10 is usually arranged in a tank for urea water solution with which a so-called SCR catalyst for a selective catalytic reduction of nitrogen oxides in exhaust gases is supplied with urea water solution. The SCR catalyst is part of an exhaust gas manifold of an internal combustion engine, for example, of a motor vehicle.

The filter 10 comprises a holder 12 with which a filter element 14 is secured. The holder 12 comprises a cover part 16 and a pump holder part 18. The filter element 14 is arranged between the cover part 16 and the pump holder part 18.

The pump holder part 18 carries a pump, not of interest in this context, with which the urea water solution can be sucked through the filter 10.

The cover part 16 and pump holder part 18 each comprise a receiving groove 22 on sides facing each other. The receiving grooves 22 serve respectively for receiving a respective rim of the filter element 14. The receiving grooves 22 extend respectively circumferentially relative to an imaginary axis 24 of the filter 10.

The filter element 14 is shown in FIGS. 3 and 4 in different perspectives. The filter element 14 follows as a whole approximately the shape of an imaginary circular cylinder wall that is coaxial to the axis 24. It is thus circumferentially bent.

The filter element 14 comprises a carrier medium 26 and a filter medium 28. The filter medium 28 is fastened, radially outwardly relative to the axis 24, by means of fusing to the carrier medium 26. The filter element 14 exhibits thus a bend across its entire section with the carrier medium 26 and the filter medium 28.

The carrier medium 26 is produced from plastic material by an injection molding process. In the injection molding process, the carrier medium 26 is manufactured in its final shape which is shown in FIGS. 1 to 7 so that, subsequent to the injection molding process, it must not be shaped further. The material of the carrier medium 26 is impermeable for liquid. The carrier medium 26 as a whole is elastic so that, after a deforming force action, it returns always into its original shape.

At its radially outer circumferential side, the carrier medium 26 comprises a plurality of circular cylindrical projections which form a surface structure that acts as a drainage structure 30. The radially outer circumferential side is facing the filter medium 28. The drainage structure 30 is located, relative to the axis 24, radially between the carrier medium 26 and the filter medium 28 in the finished filter element 14. The drainage structure 30 serves for guiding the urea water solution into an intermediate space between the carrier medium 26 and the filter medium 28.

At the radially inner circumferential side of the carrier medium 26 relative to the axis 24, a suction socket 32 is integrally formed on the side that is facing the pump holder part 18. The suction socket 32 extends from the radially inner side through the carrier medium 26 to the intermediate space with the drainage structure 30. The suction socket 32 is formed as a pipe socket at the end facing away from the filter medium 28. An imaginary axis of the suction socket 32 extends here radially to the axis 24. In the finish-mounted filter 10, the suction socket 32 is connected to a corresponding connecting part 20 of the pump, illustrated in FIG. 2.

Relative to the axis 24 in circumferential direction in front of and behind the suction socket 32, a positioning cylinder sleeve 34 is arranged, respectively. The imaginary axes of the positioning cylinder sleeves 34 are parallel to the imaginary axis of the suction socket 32. The positioning cylinder sleeves 34 interact with corresponding positioning cylinders 36 (shown in FIG. 2) provided at the pump holder part 18 and serve for positioning the filter element 14 relative to the holder 12.

The filter medium 28 is a filter medium which is suitable for filtration of urea water solution, for example, filter nonwoven or the like. The filter medium 28 is mechanically flexible and adaptable to the bend of the carrier medium 26. In the raw state, the filter medium 28 is present as a flat raw material, for example, as yard goods, which can be, for example, cut, stamped or the like with respect to its contours to the corresponding shape.

For producing the filter 10, the cover part 16 and the pump holder part 18 are pre-manufactured as separate parts, for example, by an injection molding process. The carrier medium 26 is produced in its final shape from plastic material by an injection molding process. In this context, the drainage structures 30, suction socket 32, and the positioning cylinder sleeves 34 are formed integrally.

The filter medium 28 is cut, stamped or the like from a corresponding raw material. Subsequently, the filter medium 28 is applied from the exterior onto the carrier medium 26 and seal-tightly fused thereto along the rims. The filter element 14 now has its final configuration. Due to the stiffness of the material and the material thickness of the carrier medium 26, the filter element 14 can be elastically deformed. A permanent deformation of the filter medium 14 is however not possible without causing destruction.

Subsequently, the filter element 14 is inserted into the receiving groove 22 of the pump holder part 18 and, by means of the positioning cylinder sleeves 34, aligned and positioned. The suction socket 32 is connected to the corresponding connecting part 20 of the pump. The combination of the pump holder part 18 with the filter element 14 is inserted, with the free rim of the filter element 14 leading, into the receiving groove 22 of the cover part 16.

The filter element 14 is connected, for example, by means of detachable clamping connections to the pump holder part 18 and cover part 16, respectively. In this way, the filter element 14, for example, for maintenance purposes, can be exchanged wherein the cover part 16 and pump holder part 18 can be reused.

In operation of the filter 10, the filter medium 28 is surrounded radially outwardly relative to the axis 24 by urea water solution. By means of the pump, a vacuum is generated in the intermediate space between the carrier medium 26 and the filter medium 28. In this way, the urea water solution is sucked in through the filter medium 28 radially from the exterior to the interior into the region of the drainage structure 30 between the filter medium 28 and the carrier medium 26 and thereby cleaned. Via the drainage structure, the cleaned urea water solution is sucked into the suction socket 32 and through the carrier medium 26. By means of the pump, the cleaned urea water solution is conveyed through the corresponding line to the SCR catalyst.

What is claimed is:

1. A liquid cleaning filter element comprising:
at least one cleaning medium configured to filter a liquid;
a carrier medium configured to enable detachable mounting of the liquid cleaning filter element to a holder part, the carrier medium comprising:
   a first side of the carrier medium having a drainage structure, the at least one cleaning medium arranged at and fixed onto the first side of the carrier medium;
   the drainage structure formed on the first side of the carrier medium, the drainage structure formed as a plurality of spaced apart cylindrical projections which project outwardly away from the first side of the carrier medium;
   wherein the plurality of spaced apart cylindrical projections contact against the at least one cleaning medium and space the at least one cleaning medium away from the first side of the carrier medium, forming an intermediate fluid receiving space between the at least one cleaning medium and the carrier medium;
   an oppositely arranged second side of the carrier medium;
wherein an outer rim of the at least one cleaning medium is adhesively fixed onto or material-fused to the first side of the carrier medium, such that the intermediate fluid receiving space between the at least one cleaning medium and the carrier medium is closed at the outer rim relative to an external environment of the liquid cleaning filter element;
wherein the carrier medium further comprises
   at least one liquid connector configured to connect to at least one line for liquid to be cleaned or cleaned liquid;
wherein the liquid cleaning filter element comprises
   at least one bend in at least one section provided with the at least one cleaning medium and with the carrier medium;
wherein the carrier medium, prior to being connected to the at least one cleaning medium, is pre-manufactured in a final shape of the liquid cleaning filter element;
wherein the carrier medium has a pre-defined curved or bend shape, the pre-defined curve or bend extending at least partially circumferentially relative to a circumference of the liquid cleaning filter element about an imaginary axis of the liquid cleaning filter element;
wherein the carrier medium is formed of a material providing mechanical stability to hold the predefined curve or bend shape and provides mechanical stability to the liquid cleaning filter element;
wherein the first side of the carrier medium is a radially outer surface;
wherein the at least one liquid connector comprises
   a cylindrical suction socket arranged at or fixed onto or integrated in one piece with the oppositely arranged second side of the carrier medium.

2. The liquid cleaning filter element according to claim 1, wherein
the at least one liquid connector comprising the cylindrical suction socket is integrated in the carrier medium.

3. The liquid cleaning filter element according to claim 1, wherein
the carrier medium cannot be deformed without destruction or is at the most elastically deformable such that the carrier medium resumes the pre-defined curved or bend shape once a deforming force is canceled.

4. The liquid cleaning filter element according to claim 1, wherein
the carrier medium is realized as a part selected from the group consisting of
   an injection-molded part;
   an injection-molded and cast part;
   a cast part;
   a bent part;
   a stamped part; and
   a pressed part.

5. The liquid cleaning filter element according to claim 1, wherein
the carrier medium comprises plastic material or consists of plastic material.

6. The liquid cleaning filter element according to claim 1, wherein
the carrier medium comprises metal or consists of metal.

7. The liquid cleaning filter element according to claim 1, wherein
the carrier medium comprises plastic material and metal, or the carrier medium consists of plastic material and metal.

8. The liquid cleaning filter element according to claim 1, wherein
the at least one cleaning medium is material-fused to the first side of the carrier medium.

* * * * *